No. 610,889. Patented Sept. 20, 1898.
L. BOWLES & J. W. HANSBROUGH.
ICE LOCOMOTIVE.
(Application filed Oct. 12, 1897.)
(No Model.)
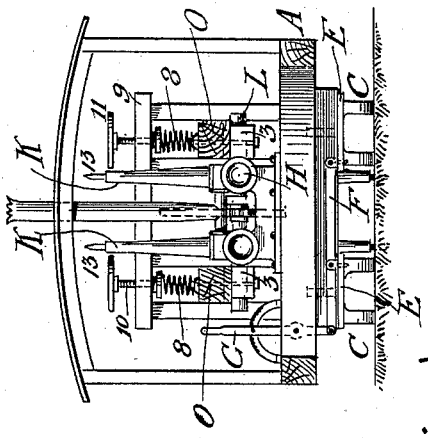
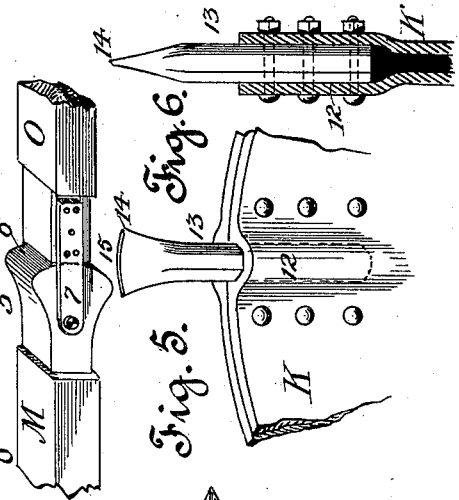
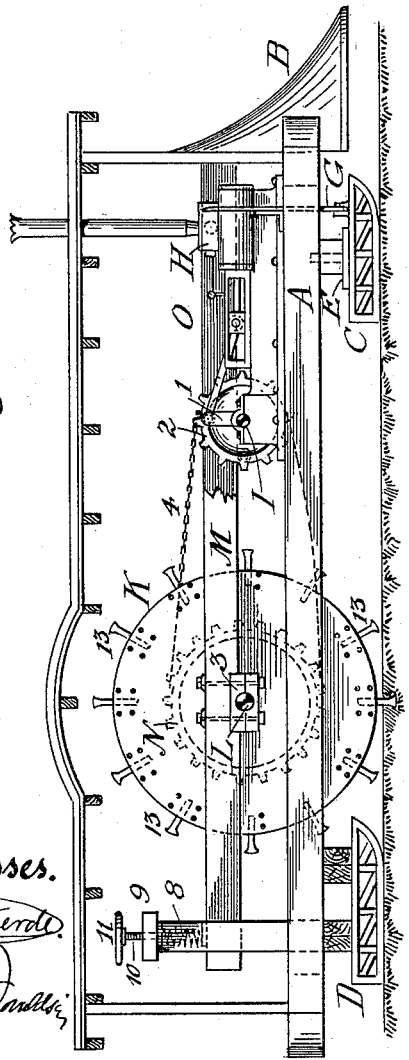
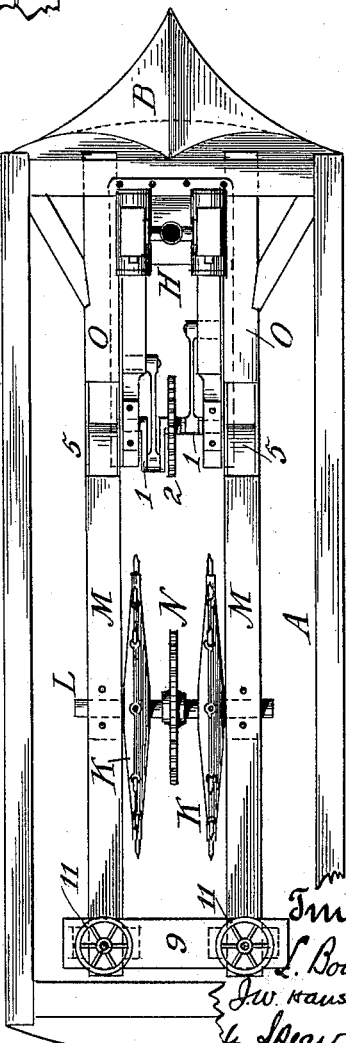
Witnesses.
Inventors
L. Bowles
J. W. Hansbrough
by Spear Seely
Attorneys

UNITED STATES PATENT OFFICE.

LEWIS BOWLES AND JOHN W. HANSBROUGH, OF SAN FRANCISCO, CALIFORNIA.

ICE-LOCOMOTIVE.

SPECIFICATION forming part of Letters Patent No. 610,889, dated September 20, 1898.

Application filed October 12, 1897. Serial No. 654,981. (No model.)

*To all whom it may concern:*

Be it known that we, LEWIS BOWLES and JOHN W. HANSBROUGH, citizens of the United States, residing at San Francisco, in the county of San Francisco and State of California, have invented certain new and useful Improvements in Ice-Locomotives; and we do hereby declare that the following is a full, clear, and exact description thereof.

This invention relates to a self-driven power-locomotive particularly intended for traveling upon frozen bodies of water and for hauling other vehicles carrying passengers or freight upon such frozen surfaces, but also capable of use on land.

The object of the invention is to provide such a locomotive of simple and powerful construction, to furnish improved driving devices, to provide means for passing over rough places without bringing undue strain upon the connections between the engine and the driving device, and, in general, to produce a locomotive which shall be of practical utility over long ice routes.

Our invention is illustrated in the accompanying drawings, in which—

Figure 1 is a side elevation of the locomotive. Fig. 2 is a front elevation of the same. Fig. 3 is a top plan. Fig. 4 is perspective of part of one of the beams on which the drive-wheel is journaled, showing its flexible joint. Fig. 5 is a side elevation of a part of a drive-wheel, showing one detachable bit in position. Fig. 6 is a cross-section of the same.

The locomotive is mounted upon a bed or frame A, shown as of rectangular construction and suitably braced and strengthened to sustain the parts carried by it. The front part of the frame carries an angular plow B to aid in breaking through drifts or banks of snow if met with, and in such cases to clear a way for the driving-wheels. The frame is mounted upon runners C C D, the forward runners C C being arranged in pairs upon swiveled trucks E for the purpose of steering. These trucks are connected by a bar F, so that the lever G can be used to turn both trucks to any angle and parallel with each other for the purpose of steering. Any other suitable means of turning the trucks can, however, be employed, such devices for turning a swing-truck being well known. The rear of the frame is supported, preferably, upon the two rigid runners D. Upon the forward part of the bed-frame are the engines H, preferably two in number, and which may be of any suitable kind, as steam or gas engines. We have shown, however, ordinary reciprocating steam-engines the connecting-rods of which are jointed to cranks 1 1 upon the engine-shaft I. On this shaft and between the cranks is a sprocket-wheel 2, which derives a constant rotation from the engine. The cranks are set quartering to avoid dead-centers. The frame, engines, and structure generally, together with any load carried by them, are supported entirely by the runners.

The driving devices consist of wheels K K, fixed upon a transverse shaft L. This shaft is journaled in boxes 3, carried by a supplementary frame consisting of two parallel beams M, which extend longitudinally above the bed-frame and on each side of the central line thereof, the wheels K K being located between the beams, bringing the driving power as near the center as possible. A sprocket N is secured upon the shaft L between the wheels K and K, which is driven by a chain 4 from the sprocket 2. The beams M are independently jointed to the rigid beams O, which form a part of the frame. This joint is shown in Fig. 4. Each beam M terminates in a head 5, having a rounded end 6, which bears against the plain end of the abutting beam O. A clevis 7 is secured to the beam O, upon which the end of the beam M is pivoted. Hence both beams M are capable of independent movement, permitting the driving-wheels to yield separately to roughnesses or inequalities in the ice. The wheels being placed near each other and the center line of the machine are capable of singly propelling the device without rendering it too difficult to steer the locomotive. The beams, with their flexible joints, are required to sustain little more than their own weight, the wheels K of course resting upon the ice or other surface. The pressure of the wheels may be adjusted by means of springs 8, held between such beams, and a cross-piece 9, supported at the rear of the machine. The pressure of these springs can be regulated by screws 10, provided with hand-wheels 11, and so the amount of pressure of the drive-wheels can be varied according to circumstances. Each drive-wheel is preferably made from two disks of boiler-plate, Figs. 5 and 6, slightly convex for strength and corrugated near the edges to form sockets 12 of polygonal shape to receive the bits 13. These bits are made with a polygonal shank to fit the sockets 12 and are provided with an ax-shaped cutting edge having sharp corner angles 14, connected by a curve 15. These bits are placed in the wheel so that the cutting edges are in the longitudinal line or direction of travel, which gives the important advantage of making a straight incision in the ice, to which they hold with great tenacity, whereas a pointed end is liable to slip by excavating pieces from the frozen surface. The two parts of the wheel are removably bolted together, as shown at 16, at each side of each socket, so that the bits are readily inserted and removed. The bits are also adjustable to different angles in the sockets.

One of the principal advantages of our mode of construction lies in the independent support for the drive-wheels, so that no matter to what extent the machine is loaded the excessive weight is carried entirely by the runners.

It will also be noted that the joints in the beams in which the drive-wheels are journaled are placed in line with the engine-shaft. Hence any oscillation of these beams is reduced to the minimum at that point, and therefore such oscillation produces no effect upon the driving-chain which is normally somewhat slack to drive to the best advantage.

The locomotive is intended to draw sleds singly or in train coupled together, and its extreme simplicity of construction and the ease with which it can be repaired make it especially useful for ice routes in a new country where facilities for repair do not exist. Although especially intended for ice routes, the machine is capable of use upon land and particularly upon a hard surface, such as frozen ground. It would only be necessary to substitute wheels for the runners in this case, and, if preferred, to change the character of the bits, making them pointed instead of hatchet-shaped. The bits shown are readily interchangeable with others, and hence any desired shape could be used when traveling upon land. The advantage of the independent support for the driving-wheels is just as apparent whether the machine runs on land or, as especially intended, upon ice, the object being to bring the weight upon the runners or wheels instead of upon the drive-wheels.

Having thus fully described our invention, what we claim as new, and desire to secure by Letters Patent, is—

1. In a locomotive a drive-wheel composed of two separate circular disks, united at their edges, said meeting edges being formed into sockets and a series of bits insertible in and removable from said sockets.

2. In combination, the main frame and runner, the engine, the bars M having rounded ends abutting against square portions of the main frame, clevises for holding said rounded ends in position, an axle journaled in said bars M, carrying driving-wheels and connections to the engine for driving said driving-wheels, substantially as described.

3. A wheel for ice-locomotives comprising the disks of sheet metal having radial opposing grooves or channels, bits seated in the openings formed by said channels, and clamping-bolts on each side of the bits connecting the disks, substantially as described.

In testimony whereof we have affixed our signatures, in presence of two witnesses, this 1st day of October, 1897.

LEWIS BOWLES.
JOHN W. HANSBROUGH.

Witnesses:
LEE D. CRAIG,
L. W. SEELY.